July 5, 1966     J. S. SWEARINGEN     3,259,182
APPARATUS FOR THE REMOVAL OF FIXED GAS
FROM ABSORPTION REFRIGERATION PROCESS
Original Filed Dec. 15, 1961     4 Sheets-Sheet 1

INVENTOR.
JUDSON S. SWEARINGEN
BY Philip Subkow
ATTORNEY

July 5, 1966  J. S. SWEARINGEN  3,259,182
APPARATUS FOR THE REMOVAL OF FIXED GAS
FROM ABSORPTION REFRIGERATION PROCESS
Original Filed Dec. 15, 1961  4 Sheets-Sheet 2

INVENTOR.
JUDSON S. SWEARINGEN
BY Philip Subkow
ATTORNEY

July 5, 1966

J. S. SWEARINGEN

3,259,182

APPARATUS FOR THE REMOVAL OF FIXED GAS
FROM ABSORPTION REFRIGERATION PROCESS

Original Filed Dec. 15, 1961

INVENTOR.
JUDSON S. SWEARINGEN
BY Philip Subkow
ATTORNEY

United States Patent Office 3,259,182
Patented July 5, 1966

---

3,259,182
APPARATUS FOR THE REMOVAL OF FIXED GAS FROM ABSORPTION REFRIGERATION PROCESS
Judson S. Swearingen, Los Angeles, Calif., assignor to Electronic Specialty Co., Los Angeles, Calif., a corporation of California
Original application Dec. 15, 1961, Ser. No. 159,531, now Patent No. 3,221,510, dated Dec. 7, 1965. Divided and this application Jan. 25, 1965, Ser. No. 432,934
8 Claims. (Cl. 165—111)

This application is a division of application Serial No. 159,531, filed December 15, 1961.

This invention relates to methods for operation of absorption refrigeration processes in which refrigeration is obtained by evaporation of a volatile refrigerant in a refrigeration zone maintained at low pressure. This low pressure is established by absorption of the resultant vapors in an absorbing liquid in an absorption zone. The vapor pressure of the refrigerant in the absorbing liquid is sufficiently low to establish the desired low temperature in the refrigerant evaporation zone. The regeneration of the diluted absorbing liquid is obtained by vaporizing the refrigerant from the absorbing liquid at a relatively higher pressure. The refrigerant vapor is condensed in a condensation zone and returned as a liquid refrigerant to the refrigerant evaporation step in the refrigeration zone of the process.

In such processes the system may become contaminated by fixed gas which arises from chemical reactions in the system or from air leaks into the low-pressure zones of the apparatus. The accumulation of this fixed gas in the system, and particularly in the low-pressure zones, such as in the absorber, interferes with the efficiency of the process. A very small volume of fixed gas, which is a much larger volume at the low pressure existing therein, can increase the total pressure in the absorbing stage materially. This will require an elevation in the temperature in the refrigerator evaporator. This results in an increase in the temperature to which fluid passing in heat exchange therewith is cooled.

The removal of fixed gas is of importance not only to obtain efficient operation of the process as described above, it is also highly beneficial in aiding in the rapid attainment of the required low temperatures when the system is first started or is re-started after a shut-down.

Should any substantial quantity of fixed gas accumulate in the refrigerant condensation zone or in any other zone in the system which is at a higher pressure than in the absorber, when the system is shut down and the pressures in the various parts of the system become equalized, the fixed gas from the condensation zone will enter the absorber, to add to any fixed gas in the absorber. Thus, when the process is restarted, there will be present in the absorber an unduly high volume of fixed gas. It will be necessary to remove this fixed gas from the absorber before the desired low temperature may be obtained in the refrigerant evaporator.

This invention relates to methods and apparatus for removal of this fixed gas. For this purpose I transport the fixed gas in the system, and particularly from the absorber, to the regeneration zone where the fixed gas and refrigerant vapor generated in the regeneration zone are introduced into a condensation zone. The vapor is condensed to form the condensate.

Fixed gas is concentrated in the vapor remaining uncondensed. The condensate is in substantial or approximate equilibrium with the vapor and fixed gas remaining after partial condensation of the vapor. The condensate may have substantial amounts of fixed gas dissolved therein. Since the vapor produced by evaporation of the condensate eventually enters the absorber, it is accompanied by the fixed gas and may undesirably add to any fixed gas in the absorber.

The condensation of the vapor by cooling the vapor and gas to form a single condensate phase and a vapor phase results in a vapor partially enriched in fixed gas and a condensate phase containing substantial quantities of fixed gas. An efficient separation of fixed gas from the vapor produced in the regeneration zone is thus not produced. The fixed gas carries a relatively high concentration of vapor. But more seriously, the condensate formed carries fixed gas dissolved therein. In such system, the generation of fixed gas, or its intrusion into the system through leaks, progressively increases the partial pressure of the gas in the system. As the partial pressure of the fixed gas increases in the absorber, the fixed gas transported to the regeneration zone increases the partial pressure of the fixed gas in the vapor produced in the regenerator. This increases the concentration of fixed gas in the condensate, to produce a vicious cycle which may result in such a high concentration of fixed gas in the absorber as to seriously interfere with the attainment of the desired low pressure in the refrigerant evaporator.

It is an object of my invention to avoid this difficulty and to carry out the condensation of the vapors produced in the regeneration step so as to produce a condensate substantially free of fixed gas and to reject the fixed gas.

I accomplish this objective, as will be described more fully below, by fractionating the vapor and stripping the condensate of fixed gas, to produce a refrigerant condensate substantially free of fixed gas and a vapor fraction in which the fixed gas is concentrated. I preferably produce a fixed gas fraction which may be substantially free of vapor. The fixed gas, when under a suitable pressure, may then be vented to ambient pressure. I circulate liquid refrigerant condensate substantially free of fixed gas to the refrigerant evaporation step, and produce in the absorber a refrigerant vapor containing such a low concentration of gases as not to substantially interfere with the attainment of the desired low pressures in the absorber. I am thus able to produce the desired low temperatures in the refrigerant evaporator, and therefore to efficiently effect the refrigeration desired. Because of the efficient separation and concentration of the fixed gas and its removal from the system, contamination of the system by fixed gas on shut down is largely prevented, and efficient and rapid re-starting of the process may occur.

In order to provide for this fractionation and stripping, I employ a vapor fractionation apparatus in which vapor passes countercurrently to a reflux condensate formed from said vapor; and the uncondensed vapor, enriched in fixed gas, is removed at one end of the flow path, and a condensate stripped of fixed gas is removed at the other end of the flow path.

In the preferred embodiment of this application, I employ a fractionating apparatus in the form of a partial condenser arranged to have an extended vapor flow path wherein the vapor is passed in counter-current flow to the flow of condensate produced from the vapor. As the vapor travels from the inlet toward the outlet of the flow path in the partial condenser, vapor is condensed, and the fixed gas becomes more and more concentrated in the vapor as the vapor is progressively condensed.

The concentration of fixed gas in the condensate is related to the concentration of the fixed gas in the vapor in contact with the condensate. Thus, the condensate from the vapor adjacent the vapor outlet from the condensation path will have fixed gas dissolved therein at a relatively high concentration. However, as the condensate travels counter-currently to the vapor in the condensation flow path, it comes in contact with vapor having a lower and lower concentration of fixed gas. The condensate at the point of discharge of the condensate from the flow path is in contact with incoming vapor carrying the lowest concentration of fixed gas, and the vapor is at its highest temperature level. The vapor passing against the counterflowing condensate strips the condensate of dissolved gas, and the vapor becomes more and more concentrated in fixed gas as the vapor travels along the condensation flow path from the inlet to the outlet. Thus, the fixed gas becomes concentrated in the vapor leaving the condensation zone, and the condensate leaving the condensation zone is stripped of fixed gas and is removed from the condensation zone with a very low concentration of or substantially free of fixed gas.

As a further improvement of the fixed gas separation procedure of my invention, I may, and preferably do, carry out the condensation of vapor in separate stages of fractionation. The uncondensed vapor and gas from an initial stage of fractionation are introduced into a subsequent stage or stages of fractionation. The reflux condensate from the first stage is removed separately from the reflux condensate removed from the subsequent stage or stages. These several condensates are thereafter commingled in a zone exterior of the fractionation stage. The concentration of the gas in the vapor in the several stages is carried out in such manner that the condensation of the major proportion of the incoming vapor occurs at an initial stage of fractionation.

As a further aid in reducing the concentration of fixed gas in the condensate, I may further strip the condensate of fixed gas by passing the condensate into contact with the superheated vapor entering from the regeneration zone, and thus cause some vaporization and a further stripping of the fixed gas from the condensate, to produce a condensate substantially free of fixed gas. The condensate recirculated to the absorber is thus substantially free of fixed gas and does not add to the fixed gas in the absorber in any material amount.

The staged fractionation zones also aid in the concentrating and accumulating of fixed gas in one zone of the system for venting and separating the condensate substantially free of fixed gas in a fixed gas accumulation zone of the system, from which the fixed gas may be vented.

In my preferred process, I provide means whereby the gas is vented when it is concentrated and accumulated at a pressure greater than ambient pressure, and without any substantial discharge of refrigerant vapor.

It is, therefore, an object of my invention to improve the efficiency of absorption refrigeration process by transporting fixed gas from the absorber to the regenerator and to fractionate the resultant vapor to separate a fixed gas and a condensate of the refrigerant substantially free of fixed gas, and to continually or intermittently remove the fixed gas from the fractionation zone when under pressure greater than ambient pressure and recirculate the condensate to the refrigerant evaporator in the refrigeration zone, and by absorption of the resultant refrigerant vapor, maintain the desired low pressure in the refrigerant evaporation zone.

It is also an object of my invention, by the aforesaid procedure, to maintain the concentration of fixed gas in the absorber and refrigerant evaporator to the desired low level, to efficiently and expeditiously start up the refrigeration process after a shutdown.

This invention is particularly directed, in its preferred form, to a process wherein the refrigerant is water and the absorbing liquid is a salt solution. In a preferred form, the concentration of the salt solution is by a staged vaporization procedure in a multiple-effect vaporizing process. In such process, the vaporization occurs in two or more stages, called "effects," at two or more different pressures. In each effect the liquid is heated and vaporized, and the vapor is separated from the liquid in a separation zone. For example, in a two-effect vaporizing step, liquid passing to the first effect separation zone is heated and partially vaporized in a heater and separated from the generated vapor in the first effect separation zone at the aforesaid higher pressure. The vapor therefrom is passed in indirect heat exchange in a first effect fractionation zone with the precooled, unvaporized salt solution produced in the first effect, and passing to the lower pressure second effect. The heat transfer cools the vapors produced in the first effect and causes condensation thereof, and heat is transferred to the circulating, partially concentrated salt solution from the high pressure first effect, to supply heat to vaporize water during the passage of the salt solution to the lower pressure second effect separation zone. The vapor produced is disengaged from the residual liquid in the second effect separation zone.

In the first effect, the vapor is condensed by the aforementioned heat exchange, at the pressure of said first effect separation zone. The vapor separated in the second effect separation zone is condensed in a second effect condensation zone by a cooling liquid passing in heat exchange with the vapor in the second effect condensation zone. Condensate from the first effect condensation zone enters the second effect condensation zone, where it is combined with condensate of vapor separated in the second effect separator, and the combined condensate stream is introduced into an evaporation zone at a still lower pressure and evaporated at such lower pressure by heat exchange with the fluid to be refrigerated. The low pressure in the last-mentioned evaporation zone is maintained by absorbing the resultant vapor in the concentrated salt solution, circulating from the second effect separation zone, suitably cooled by heat exchange with a cooling medium.

The vapor pressure of the salt solution in the absorption stage is in my process maintained sufficiently low to establish the desired pressure in the absorbing zone, and therefore in the condensate-evaporation zone, to establish the temperature of the water being evaporated at the desired refrigeration temperature.

Although by using lithium bromide solution as the above salt solution, and by the proper choice of metals, corrosion is largely suppressed, some reaction between the water and the metals may occur, to produce fixed gas such as hydrogen, which accumulates in the system. Additionally, some air may enter through leaks. This gas is herein referred to as fixed gas. Thus, it may accumulate in the absorption stage, and this may interfere with establishment of the temperature to which the refrigeration is to be carried. A very small volume of fixed gas can increase the total pressure in the absorbing stage materially, with the resultant difficulties described above.

As stated above and as will be more fully described below, in order to avoid these difficulties it is desirable to discharge the fixed gas from the absorption zone and to return from the first stage fractionation zone a condensate substantially free of fixed gas. A suitable point for this discharge for the fixed gas is in the first effect. This is suitably so if this stage operates above ambient pressure. In order to transport this fixed gas from the absorption stage to the first stage fractionation zone, I provide means for producing a mixture of the fixed gas together with the diluted absorption liquid from the low pressure absorption zone, and introduce the liquid and fixed gas into the first effect heater and separation zone, and introduce the resulting mixture of vapor and fixed gas into the first effect reflux condenser, where I fractionate the vapor and separate the fixed gas at a pressure above ambient and discharge the gas to ambient pressure.

As will be more fully described below, should, for any reason, the pressure in the first effect separation zone and in the first effect fractionator fall below ambient pressure, I provide means whereby the rate of heat transfer from the vapor in the first effect fractionation zone to the liquid passing to the second effect separation zone decreases. This results in an increase in pressure in the first effect fractionation zone. Pressure in the first effect condensation zone increases until it is again above ambient, and fixed gas is vented from the condensing zone.

In my co-pending application, Serial No. 159,531 filed December 15, 1961, now Patent No. 3,221,510 granted December 17, 1965, of which this application is a continuation-in-part, I describe and claim processes and apparatus for the transfer of such fixed gas from the absorption stage into the first stage vaporization stage. Said application is herewith incorporated by this reference as if fully set forth herein.

I have also, in my copending application, Serial No. 157,170, filed December 5, 1961, now Patent No. 3,146,602 granted September 1, 1964, of which this application is a continuation-in-part, described and claimed methods and devices for venting fixed gas from the first effect condenser when the pressure is above ambient pressure, and preventing substantial discharge of water vapor from the condensation zone. This application is incorporated herein by this reference.

In the process and apparatus of my invention forming the subject matter of this specification, I arrange the first effect fractionator so that the incoming vapor, containing fixed gas, passes countercurrent to condensate from the vapor flowing as a reflux. Heat is removed from the vapor so that the vapor is condensed, leaving a fixed gas substantially free of vapor. When pressure in the fractionating zone is above ambient, the flow of vapor and gas to the discharge opening sweeps the gas toward the vent, and through the vent valve when this valve is open to ambient pressure.

A space is provided ahead of the discharge valve in which the fixed gas can accumulate and from which it passes through the vent valves.

The vent value is formed of a pressure-sensitive and a temperature-sensitive valve. The temperature-sensitive valve keeps the vent open when the temperature-sensitive element of the valve is below the vapor condensing temperature, i.e., the boiling point of the condensate, and will close when it reaches a temperature such that it is near the boiling point. Under such conditions, when the gas is substantially free of vapor at such superatmospheric pressure, both valves are open to discharge gas. If vapor follows the gas, the latent heat of condensation is sufficient to raise the temperature-sensitive element of the temperature-sensitive valve, to actuate the temperature-sensitive valve to close the vent. If the pressure of the gas is below ambient pressure, irrespective of the temperature at the temperature-sensitive element, the vent is closed. Under these circumstances, the gas is discharged only during such time that the fixed gas is at superatmospheric pressure and substantially no vapor is discharged.

Should the pressure in the first stage vaporization space fall below ambient pressure, the vent becomes closed. As more and more gas enters the fractionation zone with additional vapor from the material entering the first effect separator, the fixed gas increases in volume and occupies more and more of the volume of the fractionation zone in which heat transfer to the cooling medium is effected. This reduces the rate of heat transfer to the vapor entering from the first effect separator.

I do not wish to be bound by any theory of why this reduction in the rate of heat transfer occurs, but it is to be noted that the rate of heat transfer per degree of temperature difference is proportional to the product of the average overall heat transfer coefficient and the area of the heat exchange surfaces.

The accumulation of the fixed gas has the effect of cutting down the surface available for heat transfer to the salt solution circulating to the second effect separator. The accumulation of the fixed gas may also modify the film coefficient and thus reduce the rate of heat transfer per unit surface. For each of these reasons or because of both of them, the rate of heat transfer per degree of temperature difference is reduced. Since the vent valve is shut and hot vapor is entering the condensation space from the first effect separator, the rate of heat transfer must be maintained. The pressure builds up, and with it the temperature, to maintain the rate of condensation in the condensation zone, thus also increasing the pressure of the accumulated fixed gas. When this pressure has reached a level above ambient pressure sufficient to open the pressure-sensitive valve, the temperature-sensitive valve also being open, the accumulated gas is discharged.

Should following water vapor enter the vent valve, it condenses in the valve case, and the liberated heat actuates the temperature-sensitive valve, which thereupon closes the vent valve. The following accumulation of the gas at the vent valve re-establishes the condition where the temperature-sensitive vent valve is again open to discharge gas.

Based on the above hypothesis, the condensation zone is at first substantially free of fixed gas and the pressure is below ambient, causing the pressure-sensitive valve to be closed. However, as fixed gas accumulates, it reduces the efficiency of the heat transfer surfaces, and this causes a rise in temperature with associated rise in pressure, as above explained, until the pressure is above ambient. Then the fixed gas is again discharged as described, and the process is repeated.

Under certain circumstances the gas is not all discharged before the pressure falls to or below ambient. In this case, the pressure-sensitive valve closes or partially closes. The discharge of fixed gas thus may be intermittent or continual.

In the preferred embodiment of my invention, I provide a suitable arrangement of the first effect fractionator in the form of a reflux condenser of elongated form such that the vapor and fixed gas enter the fractionation zone at one end and the fixed gas leaves at the opposite end of the condensation zone. I prefer to accomplish this result by arranging the reflux condenser in a configuration so that the condensate flows back out of the condenser in countercurrent contact with the vapor. The reflux condenser can have, and preferably does have, multiple passageways in parallel to increase its capacity without unfavorably raising the back pressure on the entering vapor.

The vapor enters the parallel passageways and discharges into a plenum or conduit. Preferably each of the parallel passageways has substantially equal flow resistance. For such purpose, they are made substantially similar with respect to the ratios of their respective pressure drops to their capacities. This minimizes the danger of trapping fixed gas in the passageways. Unless the passageways are designed with this criterion in mind, the vapor, enriched is fixed gas, may pass from the outlets of the low-pressure-drop passageways into the outlets of the high-pressure-drop passageways, as well as feed vapor entering the inlet end of the high-pressure-drop passageways. This traps a certain amount of fixed gas in the intermediate zone of the high-pressure-drop passageways, where it cannot be removed easily.

The vapor passageways are made elongated so that there is a segregation of enriched gas near the discharge end.

This invention will be further described by reference to the drawings, of which:

FIG. 1–7 illustrate a preferred form of reflux condenser useful in my process.

Figure 1:
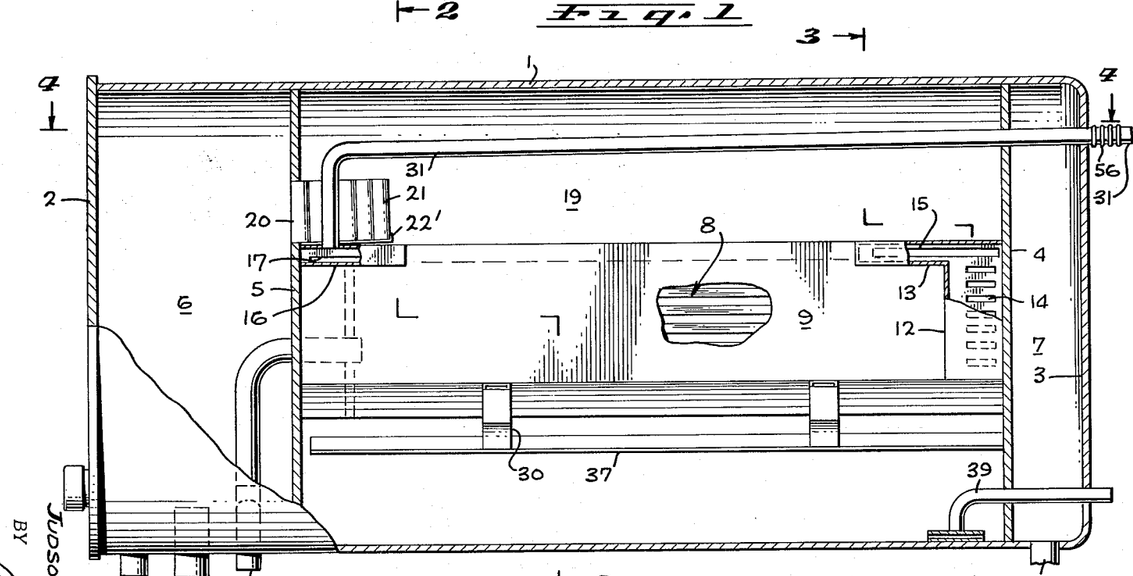
FIG. 1 is a vertical section through the first-effect condenser.
Figure 4:
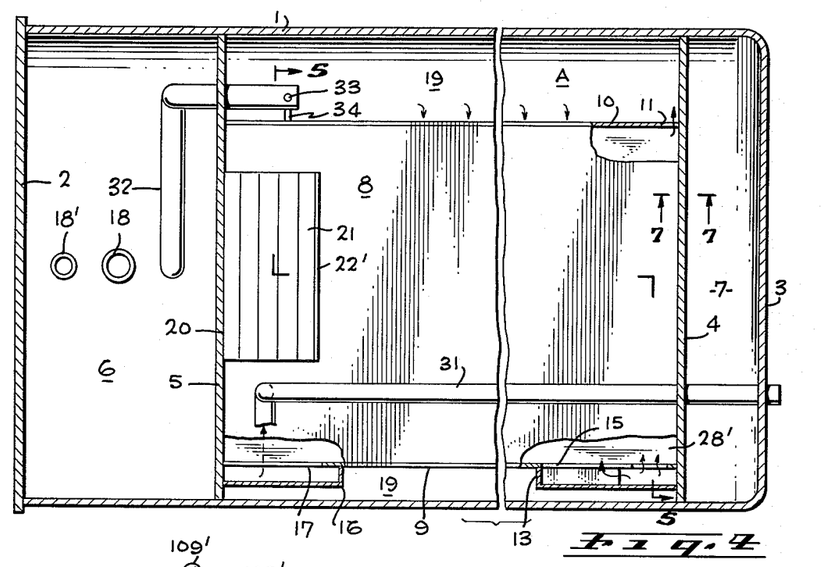
FIG. 4 is a section on line 4—4 of FIG. 1.

Referring to FIGS. 1 and 4, the condenser is formed of a shell 1, having end closures 2 and 3. A transverse partition 4 spaced from the closure 3 forms a chamber 7. Adjacent the opposite end of the condenser and spaced from the closure 2 is a partition 5 spaced from the closure 2 to form a chamber 6. Mounted between the partitions 4 and 5 and spaced from the shell 1 is a tube bundle of spaced tubular passageways, forming a condensing section 8 (see FIGS. 1, 2, 3, 5, 6 and 7), composed of parallel flattened tubular sections. The tubes are each formed of dimpled plates 22 and 23 welded together at their edges. They are spaced internally of the tube (see FIGS. 5 and 6) by internal dimples 26' to form a tubular passageway 25, closed along the marginal edges except at the end 26. A tubular entrance 29 is provided at one corner thereof opposite the open end 26. The tubular passageways 25 are spaced apart by external dimples 27 and the turned-down flange 30 (see FIG. 7) on each plate 23 at the open end. This provides vapor passageways 28 between the cooling liquid passageways 25. The number of passageways 28 and 28' required will depend, among other factors, on the volume of vapor entering 19 and on the dimensions of the flattened tubes. The number of such passageways shown in the figures is for illustrative purposes and is not to be taken as any limitation of the invention.

The bundle of tubes at their open ends 26 are positioned in the partition 4 in a rectangular slot in which they are suitably sealed, as by welding, so that cooling fluid entering through 29 and passing through passageways 25 will discharge out of the open ends 26 of the tubes into the chamber 7. Vapor passing through passageways 28 and 28' is separated from the cooling fluid by the flanges 30 and from the chamber 7 by the partition 4. Extending from partition 5 to partition 4 on one side (see FIGS. 1 and 4) of the bundle of tubes 8 is a plate 9 closing one end of passageways 28 and 28'. Plate 9 is shown in FIG. 1 broken away to reveal the tube bundle. On the other end of the bundle of condensing tubes is a plate 10 which extends along the opposite side of the uppermost passageway 28' (see FIG. 1 and FIG. 5). Plate 10 extends between the partitions 4 and 5, closing one end of the upper passageway 28' (see FIG. 5 except for a slot 11 adjacent the partition 4 (see FIG. 3).

Figure 2:
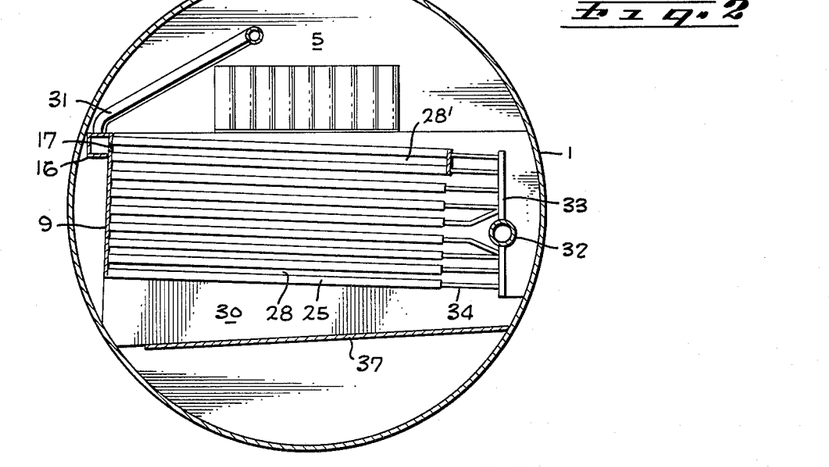
FIG. 2 is a section on line 2—2 of FIG. 1.
Figure 3:
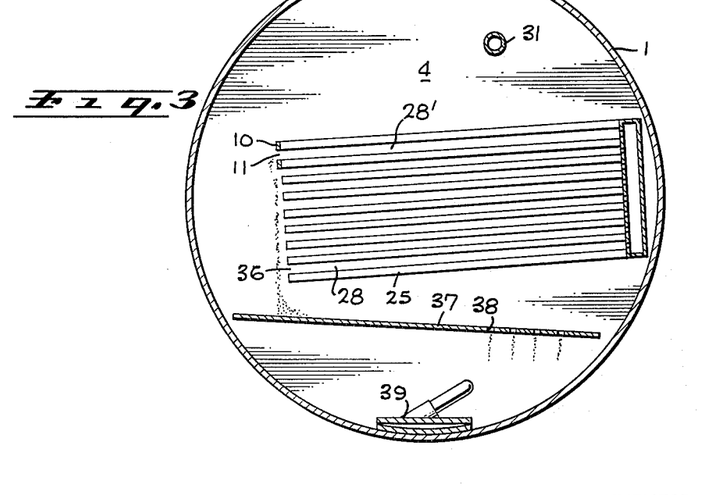
FIG. 3 is a section on line 3—3 of FIG. 1.
Figure 5:
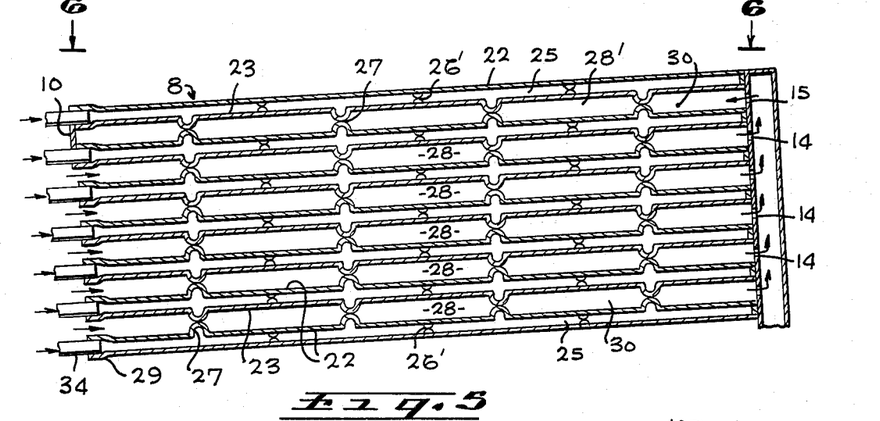
FIG. 5 is a fragmentary section on 5—5 of FIG. 4, showing the tube bundle.

On plate 9 positioned adjacent to partition 4 is an L-shaped box (see FIGS. 1, 4 and 5), having sections 12 and 13 which enclose slots 14 and 15 positioned in the plate 9 adjacent the partition 4. There is a slot 14 at each passageway 28, and slot 15 is positioned at passageway 28'. It will be observed that the slot 15 is longer in extension and of greater area than each of the slots 14. At the upper corner of the plate 9 opposite the box 12 is a box 16 positioned on plate 9 enclosing a slot 17 positioned in the plate 9 at the upper passageway 28 (see FIGS. 1, 4 and 5). The tube bundle is set so as to be inclined transversely across the shell 1 upwardly towards the slots 14, 15 and 17, as shown in FIGS. 2 and 5.

Chamber 6 may be either a vapor plenum to receive vapor, for example, from the first effect separator, or it may be the separator for vapor and unvaporized concentrated absorbent, e.g., the first effect separator. In either event, fluid enters 18 positioned in the shell 1 at the space 6 and vapor enters into the space 19, through the opening 20 and baffled passageway 21 composed of angularly positioned baffles mounted on the plate 22'. A liquid outlet is provided at 18' to remove liquid accumulating in 6.

When used in the refrigeration process employing a salt solution, the water vapor containing fixed gas enters through 20 and through the louvers 21 into 19. Space 19 is a plenum which surrounds the tube bundle but is separated from the vapor passageways in the tube bundle by plates 9 and 10. The vapor enters into the passageways 28 below plate 10 and passes in parallel flow to discharge through slots 14 into box 12. The combined flow of fixed gas largely denuded of vapor and therefore in diminished volume enters through slot 15 and passes in reverse flow toward slot 17, through which it enters the box 16.

An upwardly-sloping gas discharge tube 31 is connected to the box 16 and extends through the partition 4 and the closure 3 connected to the finned air condenser 56 to the valve (see FIG. 10) referred to above and in further discussion below.

Cooling fluid, for example the partially concentrated precooled salt solution passing to the second-effect separator, as is more fully described below, is introduced through 32 (see FIGS. 1, 2 and 5) into the manifold 33 through the tubes 34, which are fitted into the openings 29 and thus into the space 25, to flow in parallel flow through the tube bundle. The fluid is discharged through the open end 26 of the tubular passageways into the space 7, to be withdrawn through pipe 35.

The passageways 28 and slots 14 are made so that the pressure drop through all the passageways 28 and slots 14 are about equal. The aggregate area of the slots 14 is large enough and the opening 11 small enough to assure that no reverse flow of vapor enters through slot 11. Since space 19 is a plenum in which the pressure is uniform, equal vapor flow is obtained from the plenum through the open ends 36 underneath the plate 10 and flows upwardly through the parallel passageways towards the slots 14.

It will be observed that the spacing of the flattened tubes formed by plates 22 and 23 defining the passageways 28 and 28' is small compared to the area of the cooling surfaces, so as to provide a condenser with a restricted volume. The total volume of vapor and gas in the condensing passageways 28 and in the upper passageways 28' is thus small compared with the volume of the plenum chamber 19.

Vapor and gas entering through 15 are of reduced volume, reduced by condensation of vapor, and the vapor is enriched in fixed gas by the fractionation in the partial condenser section in tubes 28. The vapor is further partially condensed as it flows from the inlet slot 15 to the outlet slot 17. To this condensate is added the condensate returning along pipe 31 and entering the box 17, from which it flows through the slot 17 in counter-flow to the entering vapor and gas.

Figure 10:
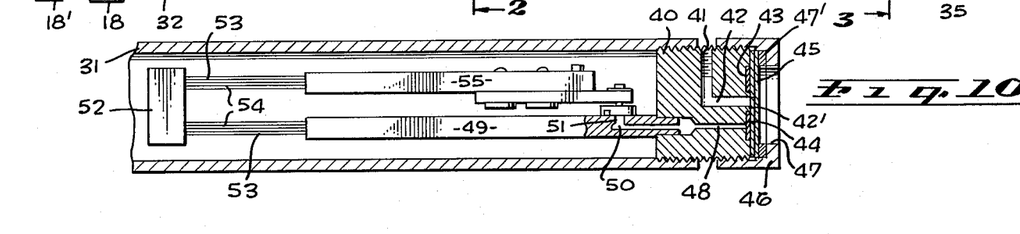
FIG. 10 is a sectional view of a pressure and temperature-sensitive valve useful in connection with the apparatus and process of my invention.

The vent valve more fully described below and shown on FIG. 10 is connected to the pipe 31. An air-condenser section is provided ahead of the vent valve. This may be provided by attaching fin sections 56 to the pipe ahead of the vent valve (see FIG. 10), to be more fully described below. Thus, vapor entering pipe 31 flows toward the vent valve and is further partially condensed in the air-cooled condenser section and also in the vent valve as described below. The fixed gas collecting in the vent valve is substantially free of vapor. Condensate formed in the pipe 31, condenser 56, and in the vent valve flows down the pipe 31, into the box 16 and through the slot 17 into the upper passageway 28', as described above.

Vapor entering from the plenum 19 passes in heat exchange with the cooling fluid in 25 through the tube walls 22 and 23. The vapor condenses at the surfaces of 22 and 23, and the condensate collecting on the plates 22 flows down the plates in the passageways 28 toward the openings 36. Due to the fluid flow conditions in the above passageways, there is an intimate contact between vapor ascending the passageways 28 and 28' and the condensate descending the plates 22.

The vapor entering 19 is at a temperature above the boiling point of the water condensate at the pressure in 19, since it has been derived by vaporization of a salt solution at substantially the pressure in 19. In the passageways 28, heat is abstracted by the cooling fluid in tubes 22, and vapor is condensed progressively as the vapor travels toward the slots 14. In passing through the passageways 28, the vapor becomes more and more enriched in fixed gas in the course of its travel to the slots 14. Condensate formed in the upper reaches of the passageways 28 adjacent the plate 9 contains a relatively high concentration of fixed gas and flows down the passageways 28 as a reflux condensate in counter flow to the vapor and gas passing through pasageways 28 to the slots 14. As the condensate flows down the sheets 22, it is stripped by the counterflowing vapor, and the vapor is enriched in fixed gas by a process of fractionation.

The uncondensed vapor containing the fixed gas which is thus concentrated by the process of fractionation passes into the passageway 28', as described above. During its flow through the passageway 28' to the slot 17, heat is removed from the vapor and fixed gas by the cooling fluid, and further condensation of vapor occurs. To this condensate is added the condensate entering through the pipe 31. Condensate in the passageway 28' flows toward the outlet 11. Reflux action in the upper passageway 28' occurs, and a further fractionation concentration of the fixed gas results.

The remaining fixed gas enters the pipe 31, containing a minor amount of vapor, and passes to the air-cooled condenser 56 and into the case 31', where it is exposed to ambient temperatures in the atmosphere surrounding the air-cooled condenser 56 and the valve case 31'. Condensate formed in the condenser 56 and valve case is returned via pipe 31. It flows countercurrent to the fixed gas and contained vapor, passing upwardly through pipe 31, and a further refluxing action and fractionation occurs, to partially strip the condensate of fixed gas and further concentrate the fixed gas. The final condensation occurring in the condenser 56 and in the vent valve reduces the vapor content of the fixed gas in the vent valve case to a low value, and the fixed gas accumulating in the vent valve case is substantially free of fixed gas.

The condensate in the passageways 28 and 28' discharges through the openings 36 and 11, respectively, and falls onto the plate 37. It flows as a sheet across the tray to the discharge 39. In doing so, the condensate is in contact with the hotter vapor in 19, and further stripping and partial vaporization of the condensate occurs, to produce a condensate fraction collecting at the discharge outlet 39 (see FIG. 1) which is substantially free of fixed gas.

The liquid outlet 39 is remote from and isolated from the accumulating fixed gas and is also isolated from and remote from any liquid containing any significant proportion of dissolved fixed gas in the fractionation zone. Thus, the circulation of fixed gas to the outlet 39 is inhibited.

The fixed gas accumulating at the vent valve will be substantially at the pressure in the reflux condenser and will vent through the vent valve whenever this pressure is above ambient pressure, provided that it does not contain substantial quantities of vapor. Thus, fixed gas is continuously or intermittently bled from the system, and the concentration of fixed gas in the absorber and in the refrigerant evaporator is maintained at the desired low value.

FIG. 10 illustrates one temperature and pressure-sensitive valve which may be used with the above condenser in my process of refrigeration.

The vent valve case 31' is mounted on pipe 31, downstream from the air-cooled condenser 56. The case is closed with a fitting 40 carrying an L-shaped vent opening 41, terminating in a bore 42 positioned centrally of the fitting at the central boss 42'. The bore 42 communicates wtih ambient pressure outside the valve case 31' through bore 41. An annular groove 43 surrounds the bore 42 and boss 42'. The diaphragm support ring 44 fits in annular groove 43. A diaphragm 45 and the diaphragm support ring 44 are held in place by a washer 47' and a retainer cap 46. The retainer cap is open to atmosphere through bore 47. A bar 49, carrying an end bore 50 and a side bore 51 communicating with bore 50 is mounted in the fitting so that bore 50 communicates with bore 48, formed in the fitting 40 and terminating at the groove 43.

A block 52 is connected to the bar 49 by two spaced strips of metal 53 and 54 having different linear thermal coefficients of expansion. For example, strip 53 may be type 304 stainless steel and strip 54 may be of Invar metal. A rod 55 extends parallel to the bar 49 and is connected to the block 52 by two like metal strips 54 and 53. The rod 55 carries a valve disc 56 which seats to close the bore 51.

Thus, when the strips 53 and 54 are heated by the condensing water, the bimetallic members composed of strips 53 and 54, due to their unequal expansion, will hold the valve disc 56 against the bore 51, to close the bore 51. But when not so heated, when only gas is in the pipe 31, the strips are chosen of such length and curvature that the disc 56 is lifted off the bore 51.

The strips 53 and 54 are spaced apart sufficiently that vapor can enter between them and condensate will drain out. This permits heating on both sides of each strip when the vapor reaches them and increases the rate of response of the valve to temperature.

If the pressure in 31' is higher than ambient, this higher pressure will force the diaphragm 45 away from the retainer ring 44 and the boss 42', to uncover the bore 42. If the valve disc 56 is off its seat under these conditions, gas is vented through bores 51, 50, 48, 43, 42 and 41 to ambient pressure. If the pressure in the valve case 31' is less than ambient pressure, the diaphragm is seated on the boss 41', to close communication between 41 and 48.

Thus, communication between the valve case 31' and ambient pressure is possible only when both the pressure in 31' is higher than ambient pressure and vapor is not present in valve case 31'.

If the vent valve described above closes, gas accumulates as described above. If the pressure is above ambient pressure and closing of the valve is occasioned by the entry of vapor into the valve case, due to a vapor flow which the air-cooled condenser could not condense, the valve is closed, even though the pressure is above ambient. In this manner, the valve prevents the escape of vapor from the system and discharges fixed gas substantially free of vapor.

The condensation of the vapor will permit the fixed gas to again accumulate in the valve case 31'. This causes the temperature-sensitive elements to lift the valve disc 56, and the fixed gas is vented, super-ambient pressure being present in valve case 31'.

Should the pressure in the valve case fall below ambient for any reason, for example, as described above and below, and should fixed gas continue to be generated in the process of fractionation in the reflux condenser, the fixed gas accumulating as described above will begin to back up into the air-cooled condenser 56 and the upper passageway 28', and, if this process continues, through the slot 15 into the lower passageways 28.

The fixed gas thus fills part of the volume of the passageway 28', and if the accumulation of fixed gas continues, it may also fill part of the volume of the passageways 28. This thus reduces the area of the plates 22 and 23 in heat exchange with the vapor. It may also, as described above, reduce the rate of heat transfer through the surface in contact with vapor. The consequence is that the pressure in the passageways 28 and 28' increases, and thus the pressure in the valve case 31' increases until it is again above ambient, and fixed gas substantially free of vapor is discharged to ambient pressure outside the value case 31'.

By using an extended cooling surface such as described herein, the ratio of the total volume of vapor space to condensing surface is relatively small. The effect of the accumulation of gases upon the rate of cooling will be materially increased since the volume of uncondensed gas necessary to cause a sufficiently marked impairment in heat-transfer rate is less than if the ratio of volume to surface was large. This increases the sensitivity of the system.

It is one of the objects of my invention to employ the aforesaid system as the first-effect condenser in a multiple-effect absorption refrigeration process.

Figure 8:
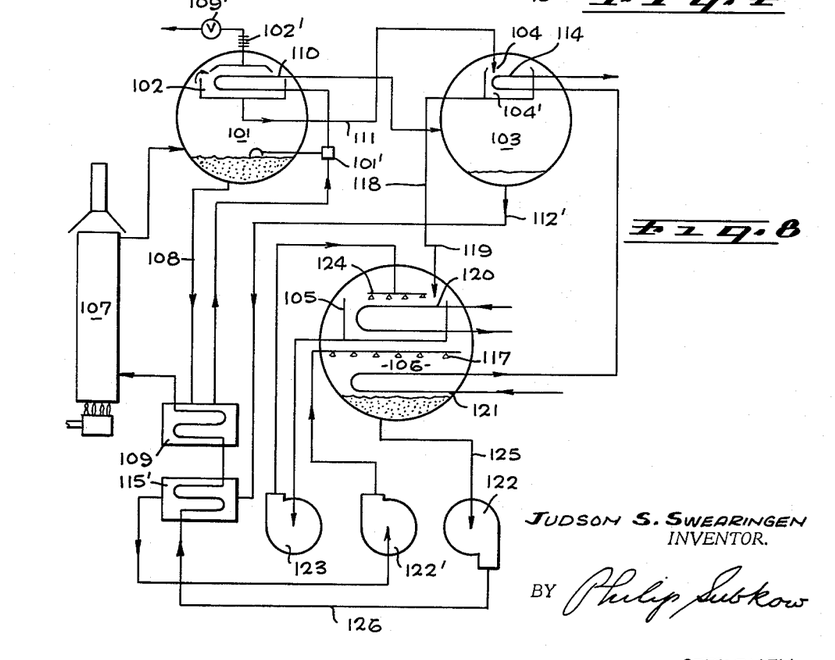
FIG. 8 is a schematic flow sheet of a refrigeration process.

Such a system is illustrated in the schematic flow-sheet shown in FIG. 8.

The refrigerant which, for example, may be a salt solution, preferably lithium bromide in water solution carrying some fixed gas, is heated in heating zone 107 to the boiling point and introduced into a separating zone 101, for example 6 in FIG. 1, where the unvaporized concentrated lithium bromide solution is separated from the water vapor. The pressure in the separating zone may be any suitable pressure, but is conveniently somewhat above ambient pressure, e.g., atmospheric pressure.

The water vapor containing fixed gas is passed to a fractionating zone 102 such as the reflux condenser of FIGS. 1-7. The partially concentrated solution collecting in 101 is passed via line 108 and cooled by heat exchange in 109, in indirect heat exchange with the relatively cooler, dilute lithium bromide solution passing to the heating zone 107. The partially concentrated solution is thus cooled to a lower temperature and passed under control of a float valve via coil 110 (for example, tube 22) in indirect heat exchange, in the reflux condenser shown schematically at 102, with the water vapor and fixed gas separated in the aforementioned separating zone 101. The water condensate, substantially free of fixed gas, obtained by the process of fractionation described above, accumulates in the separating zone of the reflux condenser 102 as, for example, in space 19 of FIG. 1.

Uncondensed gas substantially free of water vapor is obtained by the process of fractionation described above and passes through the air cooler 102' (for example, 56 of FIG. 10), and is discharged to ambient pressure through vent valve 109', for example, the valve of FIG. 10.

The water condensate thus produced is passed from the reflux condenser through pipe 111 as, for example, through 39 of FIG. 1, and is discharged into the second condensation zone 104', operating at the lower pressure of zone 103. This is preferably at a low sub-atmospheric pressure. As an example, it may be of the order of 0.1 of an atmosphere.

The partially concentrated lithium bromide from 101, in passing through 110, partially vaporizes in 110 as it passes to the lower pressure zone 103. In doing so, it abstracts heat from the vapor and gas in the fractionating zone of the reflux condenser 102. Unvaporized concentrated solution and vapor generated in 110 are separated in 103. The vapor enters the condenser section 104', where it is commingled with the flashed condensate from 102, for example, introduced from the outlet 39 of FIG. 1. The combined water vapor is condensed in 104' by heat exchange with cooling liquid passing through coil 114.

The commingled water condensate from 104' then passes through line 118 and is introduced via pipe 119 into refrigeration evaporator 105, operating at a still lower pressure. The condensate from 119 passes in heat exchange with fluid in 120, for example, water, which is to be cooled in the refrigeration process. The unvaporized liquid in 105 is recirculated by pump 123 through spray 124. The water condensate is thus vaporized, and the fluid in 120 is cooled.

The concentrated solution in 103 is passed via line 112', heat exchanger 115', where it is cooled and pumped by pump 122', into 106 via sprays 117. The water vapor from 105 is absorbed in 106 in the concentrated lithium bromide solution introduced via 117, cooled by cooling liquid passed through 121 in series with coil 114.

The vapor pressure of the absorbent liquid in the absorber 106 is lower than the vapor pressure of the liquid in 103, and establishes the pressure in the refrigerator evaporation zone 105. Thus, depending on the temperature of the cooling water, and therefore the temperature of the absorbing liquid, the pressure may be of the order of a few millimeters of mercury absolute pressure and sufficient to establish the desired temperature of the water in contact with the coils 120. The diluted lithium bromide solution passing through line 125 is pumped by pump 122 and line 126 through heat exchangers 115' and 109 to the heater 107.

It will thus be seen that any material amounts of fixed gas in the absorber 106 will raise the total pressure in the absorber materially. The temperature in the evaporator 105 will be the greater, the higher is the concentration of fixed gas in the absorber. This could, if the partial pressure of the fixed gas be material, severely restrict the temperature to which the water in 120 may be cooled.

The process described above permits of the removal of this fixed gas and its discharge through 109'. The condensate returned from 102 eventually into 120 is made to be substantially free of fixed gas. Thus, an efficient venting of fixed gas without material loss of refrigerant water vapor is obtained.

It is thus one of the advantages resulting from the use of my fractionation process that, because there is no substantial loss of water vapor, the salt concentrations in the various stages of the operation may be maintained substantially constant, and the operation may be thus made cyclic and continuous. Any substantial loss of water vapor in the vent gas would result in a gradual concentration of the salt solution and thus upset the balance of the system, requiring periodic additions of water or adjustment of the temperature and pressure levels in the system.

Figures 6, 7, 9:
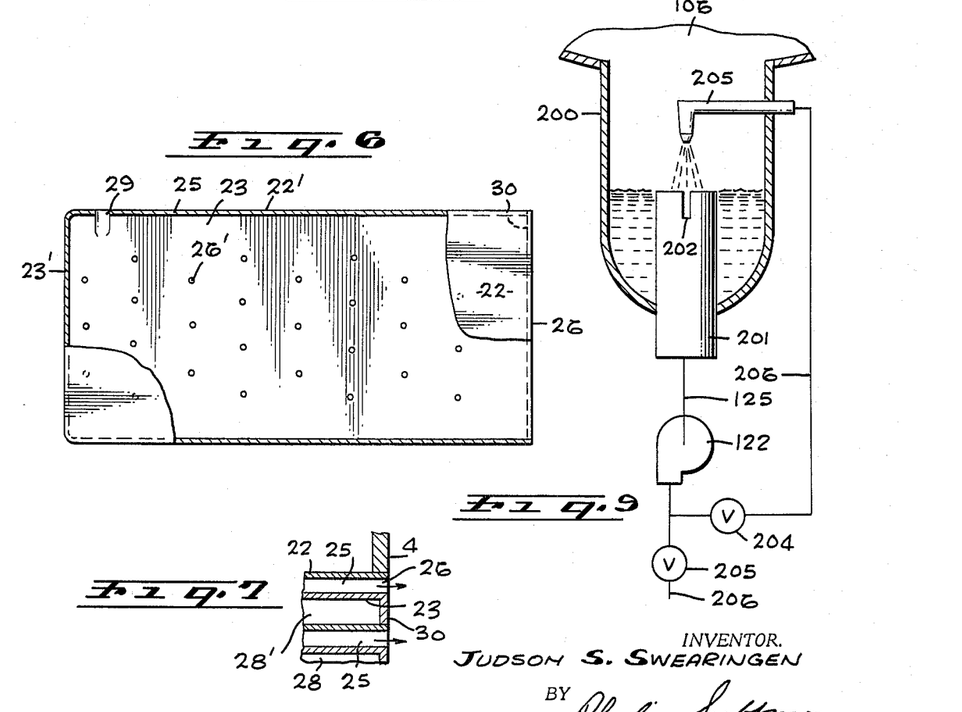
FIG. 6 is a sectional detail of the tube bundle taken on line 6—6 of FIG. 5.
FIG. 7 is a plan view of a detail of a tube on FIG. 6.
FIG. 9 is a schematic showing of a detail of a modification of FIG. 8.

In order to transport fixed gas in the absorber to the vapor fractionating system 102, I may and preferably do employ means to withdraw vapor and fixed gas from the absorber, along with the diluted salt solution in 106. Fixed gas in 106 unabsorbed in the salt solution is commingled with the liquid in 106 and conveyed, together with this liquid, through heater 107 and introduced into 101. FIG. 9 illustrates a means for this purpose, described and claimed in my copending application, Serial No. 159,531. The chamber 106 is provided with a sump 200 in which the diluted salt solution is accumulated. Mounted in the bottom of this sump is a vertical tube 201, slotted at the top at 202. A nozzle 205 is mounted so that it is in axial alignment with the tube 201. Tube 201 is connected to pump 122 by line 125, as in FIG. 4. The output of the pump 126 is split by valves 204 and 205. The stream through 205 passes to heat exchanger 115' of FIG. 4 via line 126; the stream from 204 enters the nozzle 205' via line 206. The jet stream from the nozzle falls inside tube 201. Liquid in the sump 200 also enters the tube through the slot 202.

The multiple, discontinuous streams of discrete liquid bodies in spray form impinge on the surface of the moving column of liquid in tube 201 in a statistical manner, so as to form changing zones of turbulence across the surface of the liquid. The liquid forms pockets in which the gas and vapor are entrapped in the form of bubbles. The flowing liquid stream receives additional liquid from the sump so that the total flow of liquid through 201 is greater in volume than the liquid volume entering from the sprays.

The multiple streams of liquid coalesce into a gas-liquid body to form a coherent but heterogeneous mixture of gas and liquid in 201, where the liquid is the continuous phase and the gas is the dispersed phase.

The heterogeneous stream of liquid and gas falls through a head to the pump 122 at a velocity sufficient to overcome the separating tendency of the gas bubbles.

As the liquid falls, the hydrostatic pressure on the bubbles increases. Substantially all of the vapor is absorbed, due to the increase in pressure, and the residual gas is compressed to form smaller bubbles. Due to the condensation of vapor and compression of the gas, the liquid-gas mixture is introduced into the pump 122 without substantial separation of gas from its dispersion in the liquid. The heterogeneous gas and liquid dispersion is thus a pumpable mixture and not a froth. If the concentration of fixed gas in the heterogeneous stream is sufficiently low, the gas may in fact be completely dissolved in the liquid, and thus the liquid in the pumped stream have no discrete gas phase. While this is possibly the case in the high pressure stream from the pump 122, under the conditions of operation in the refrigeration process of this application, the stream entering the pump, in the usual case, will be a heterogeneous stream in which the gas is the discontinuous phase and the liquid the continuous phase.

The fixed gas and diluted salt solution are then passed to the heater 107 and into the separator 101. By regulating the rate of recirculation of the liquid through 206, the rate of fixed gas removal from 106 may be made sufficiently great to permit of the maintenance of the desired low partial pressure of gas in the absorber 106. This is aided in a material sense because the volume of gas to be removed is minimized by the fact that it need be only that which is generated in the system and which enters through leaks. Because of the efficient vapor fractionation of the vapor in the fractionating system 102, substantially no fixed gas is recycled into the absorber from 102.

While I have described a particular embodiment of my invention for the purpose of illustration, it should be understood that various modifications and adaptations thereof may be made within the spirit of the invention, as set forth in the appended claims.

I claim:

1. A reflux condenser comprising a shell, a vapor plenum in said shell, a vapor inlet connected to said vapor plenum; a tube bundle composed of a plurality of inclined flattened condenser tubes positioned in said shell, the tubes of said tube bundle being formed of pairs of spaced rectangular plates sealed together along their edges and spaced apart at one end thereof to form an open end and forming a fluid passageway between said plates, a plenum connected to said open ends of said tubes, a separating wall separating said last named plenum from said vapor plenum in said shell, said flattened tubes being spaced apart to provide vapor passageways between said tubes; a plate closing the upper end of said vapor passageways and extending along one edge of all of said passageways, the other end of said passageways connecting to said vapor plenum; and a vapor discharge conduit connected to said vapor passageways to pass uncondensed vapors from said vapor passageways, and a liquid outlet from said shell.

2. In the reflux condenser of claim 1, a splash plate positioned in said shell, underneath said tube bundle, to receive condensate from said vapor passageway, and discharging into said shell.

3. In the condenser of claim 1, a plurality of vapor orifices in said plate, one at each of said vapor passageways, a box mounted on said plate enclosing said orifices, a second plate positioned along the uppermost pair of said flattened tubes to close the uppermost vapor passageway along the tube edge opposite said first-mentioned plate; a second orifice in said first-mentioned plate at said uppermost vapor passageway and spaced from said orifice at said uppermost passageway in said box, said vapor discharge conduit connected to said second orifice at said uppermost passageway.

4. In the reflux condenser of claim 3, a splash plate positioned in said shell, underneath said tube bundle, to receive condensate from said vapor passageway, and discharging into said shell.

5. In the condenser of claim 1, a condenser connected to said vapor discharge conduit, a vapor outlet from said last-named condenser, and a pressure and temperature-sensitive valve connected to said outlet.

6. In the condenser of claim 2, a condenser connected to said vapor discharge conduit, a vapor outlet from said last-named condenser, and a pressure and temperature-sensitive valve connected to said outlet.

7. In the condenser of claim 3, a condenser connected to said vapor discharge conduit, a vapor outlet from said last-named condenser, and a pressure and temperature-sensitive valve connected to said outlet.

8. In the condenser of claim 4, a condenser connected to said vapor discharge conduit, a vapor outlet from said last-named condenser, and a pressure and temperature-sensitive valve connected to said outlet.

References Cited by the Examiner

UNITED STATES PATENTS

| | | | |
|---|---|---|---|
| 2,182,183 | 12/1939 | Thompson | 165—157 X |
| 2,614,816 | 10/1952 | Hull | 165—111 |
| 2,703,700 | 3/1955 | Simpelaar | 165—113 |

ROBERT A. O'LEARY, *Primary Examiner.*

FREDERICK L. MATTESON, JR., *Examiner.*

A. W. DAVIS, *Assistant Examiner.*